(12) United States Patent
Kim

(10) Patent No.: US 12,028,183 B2
(45) Date of Patent: Jul. 2, 2024

(54) SYSTEM FOR CYBER BOUNDARY WALL USING SDN-BASED ZERO WALL PAD AND OPERATION METHOD THEREOF

(71) Applicant: SecureA Co., Ltd., Bucheon-si (KR)

(72) Inventor: Young Kyu Kim, Seoul (KR)

(73) Assignee: SecureA Co., Ltd. (KR)

( * ) Notice: Subject to any disclaimer, the term of this patent is extended or adjusted under 35 U.S.C. 154(b) by 0 days.

(21) Appl. No.: 18/016,711

(22) PCT Filed: Jul. 20, 2021

(86) PCT No.: PCT/KR2021/009337
§ 371 (c)(1),
(2) Date: Jan. 18, 2023

(87) PCT Pub. No.: WO2022/019611
PCT Pub. Date: Jan. 27, 2022

(65) Prior Publication Data
US 2023/0275780 A1    Aug. 31, 2023

(30) Foreign Application Priority Data

Jul. 24, 2020   (KR) .................. 10-2020-0092146
Jul. 12, 2021   (KR) .................. 10-2021-0091109

(51) Int. Cl.
*H04L 12/18*    (2006.01)
*H04L 9/40*     (2022.01)
(Continued)

(52) U.S. Cl.
CPC ........ *H04L 12/282* (2013.01); *H04L 12/1403* (2013.01); *H04L 63/0272* (2013.01)

(58) Field of Classification Search
CPC .............. H04L 12/282; H04L 12/1403; H04L 63/0272
See application file for complete search history.

(56) References Cited

U.S. PATENT DOCUMENTS 8,868,248 B2 * 10/2014 Park ............... H02J 3/14
                                            700/297
10,135,792 B2 * 11/2018 Lapidous ........... H04L 63/0272
(Continued)

FOREIGN PATENT DOCUMENTS

JP    2006-217078 A2    8/2006
KR    10-1743559 B1     6/2017
(Continued)

OTHER PUBLICATIONS

International Search Report and Written Opinion of PCT/KR2021/009337, dated Oct. 20, 2021. pp. 1-6.

*Primary Examiner* — Nazia Naoreen
(74) *Attorney, Agent, or Firm* — David L. Nocilly; Bond, Schoeneck & King PLLC

(57) ABSTRACT

The present invention relates to a system for a cyber boundary wall using a software defined networks (SDN)-based zero wall pad and an operation method thereof, the system comprising: a wall pad in which an operating system (OS) has been removed and which provides a user interface for controlling Internet of Things of a corresponding household; a household switch that is connected to the Internet of Things and a smart metering network, performs a router function of the wall pad, and controls the Internet of Things on the basis of control information for the Internet of Things, to be input via the wall pad; a server that receives, via the household switch, data about the Internet of Things of the corresponding household, generates a virtual screen corresponding to the user interface, on the basis of the data about the Internet of Things of the corresponding household, and then provides the generated virtual screen to the wall pad; and a virtual private network (VPN) server that interworks with the household switch and the server.

1 Claim, 8 Drawing Sheets

(51) Int. Cl.
*H04L 12/14* (2024.01)
*H04L 12/28* (2006.01)

(56) References Cited

U.S. PATENT DOCUMENTS

| | | | | |
|---|---|---|---|---|
| 10,701,103 | B2* | 6/2020 | Aggarwal | H04L 63/1425 |
| 11,463,244 | B2* | 10/2022 | Lee | H04L 9/0825 |
| 11,575,535 | B2* | 2/2023 | Garg | G06F 9/451 |
| 2020/0186383 | A1* | 6/2020 | Sebastian | H04W 4/70 |

FOREIGN PATENT DOCUMENTS

| | | |
|---|---|---|
| KR | 10-2017-0126648 A | 11/2017 |
| KR | 10-2019-0053433 A | 5/2019 |
| KR | 10-2020-0016025 A | 2/2020 |

\* cited by examiner

SYSTEM FOR CYBER BOUNDARY WALL USING SDN-BASED ZERO WALL PAD AND OPERATION METHOD THEREOF

TECHNICAL FIELD

The present invention relates to cyber boundary wall technology using a software defined networks (SDN)-based zero wall pad, and more particularly, to a system and method for a cyber boundary wall service that may implement, through a logical network separation, a cyber boundary wall construction method for preventing hacking of a smart home system using a zero wall pad through a virtual machine for each household that is configured as SDN.

RELATED ART

A smart home refers to using a technical system, an automated process, and a remote-control device in an apartment or a house. The main purpose of the smart home is to improve quality and convenience of life in the house, to enhance security, and to increase energy efficiency using a connected remote-control device.

A smart home system may control home appliances, such as a washing machine, a light, and a coffee machine, by time and may run a motion sensor, a camera, a shutter, and a thermostat through a process set by a user. The center of the smart home is a central control unit, which may be connected with a plurality of smart devices and controlled with a personal computer (PC), a smartphone, or a tablet. For communication and control, standard wireless technology, such as wireless fidelity (WiFi), Bluetooth, ZigBee, and Z-Wave, is used and the central control unit is referred to as a hub or a gateway.

As a smart home is rapidly being introduced and Internet of things (IoT) devices, for example, a smart door lock, a smart light, a smart television (TV), a smart refrigerator, a smart washing machine, and a smart rice cooker, are rapidly increasing, a wall pad to accommodate the same is also developing to high specifications. Since the wall pad collects data of IoT devices and transmits the data to a server in a control room through a home network of an apartment building, security is in a vulnerable state and a wall pad embedded with an operating system (OS) (e.g., Windows CE, Android, etc.) is subject to hacking due to vulnerability of the OS. In particular, in the case of the apartment building, if only one household is hacked, all apartment households may be hacked.

To solve such an issue, the concept of a cyber boundary wall is introduced and a solution for preventing intrusion of a hacker on a network is developed and trial-installed by separately installing a gateway in a household and by configuring a virtual local area network (VLAN) from the gateway to a server in a control room through a physical network separation. However, when a wireless section occurs between a wall pad and the IoT, the hacking threat against the wall pad still exists. As the number of smart home services increases, specifications of the wall pad is inevitably developed to higher specifications and if an additional gateway needs to be installed and an OS is included in the wall pad, the hacking threat does not disappear.

DETAILED DESCRIPTION OF THE INVENTION

Technical Subject

Example embodiments of the present invention provide a system and method for a cyber boundary wall service that may implement, through a logical network separation, a cyber boundary wall construction method for preventing hacking of a smart home system using a zero wall pad through a virtual machine for each household that is configured as software defined networks (SDN).

Solution

A cyber boundary wall system according to an example embodiment of the present invention includes a wall pad in which an operating system (OS) is removed and configured to provide the Internet of Things (IoT) of a corresponding household; a household switch configured to connect to the IoT and a smart metering network, to perform a router function of the wall pad, and to control the IoT based on control information on the IoT that is input through the wall pad; a server configured to receive data about the IoT of the corresponding household through the household switch, to generate a virtual screen corresponding to the user interface based on the data about the IoT of the corresponding household, and then to provide the generated virtual screen to the wall pad; and a virtual private network (VPN) configured to interwork with the household switch and the server.

The server may include a virtual machine for each household and may generate the virtual screen using the virtual machine of the corresponding household and then to provide the generated virtual screen to the wall pad.

The household switch may perform a gateway function and may provide an interface for adding at least one wireless communication module that includes a wireless fidelity (WiFi) module, a Bluetooth module, and a ZigBee module to provide a smart metering service that includes at least one of gas, hot water, electricity, and water.

The IoT and the smart metering network may be controlled and monitored through connection to the virtual machine for each household through the VPN.

An operation method of a cyber boundary wall system according to an example embodiment including a wall pad in which an OS is removed and configured to provide a user interface for controlling the IoT of a corresponding household, a household switch configured to perform a router function of the wall pad that interworks with the IoT of the corresponding household, and a server configured to generate a virtual screen corresponding to the user interface based on data about the IoT of the corresponding household and then to provide the generated virtual screen to the wall pad, the method including receiving, by the server, IoT data of the corresponding household by the household switch through a VPN; generating, by the server, the virtual screen corresponding to the user interface based on the IoT data and providing the generated virtual screen to the wall pad; and controlling, by the household switch, the IoT based on control information on the IoT input through the wall pad.

Effect of Invention

According to example embodiments of the present invention, it is possible to enhance security strength, to decrease a smart home system construction cost, and to reduce a maintenance and repair cost by implementing a cyber boundary wall construction method for preventing hacking of a smart home system using a virtual desktop infrastructure (VDI)-based zero wall pad through a logical network separation.

According to example embodiments of the present invention, although a cyber boundary wall between households is implemented through a logical network separation, security strength is superior to that of the existing physical and software network separation and it may be introduced to all apartment buildings and expandability is excellent since a physical network device is not required.

According to example embodiments, security may be enhanced with a double boundary wall by constructing a primary cyber boundary wall in which a software defined networks (SDN)-based zero wall pad and a server are virtualized and by constructing a secondary cyber boundary wall through a virtual private network (VPN) that interworks with a zero switch and a virtualization server.

BEST MODE

Figure 1:
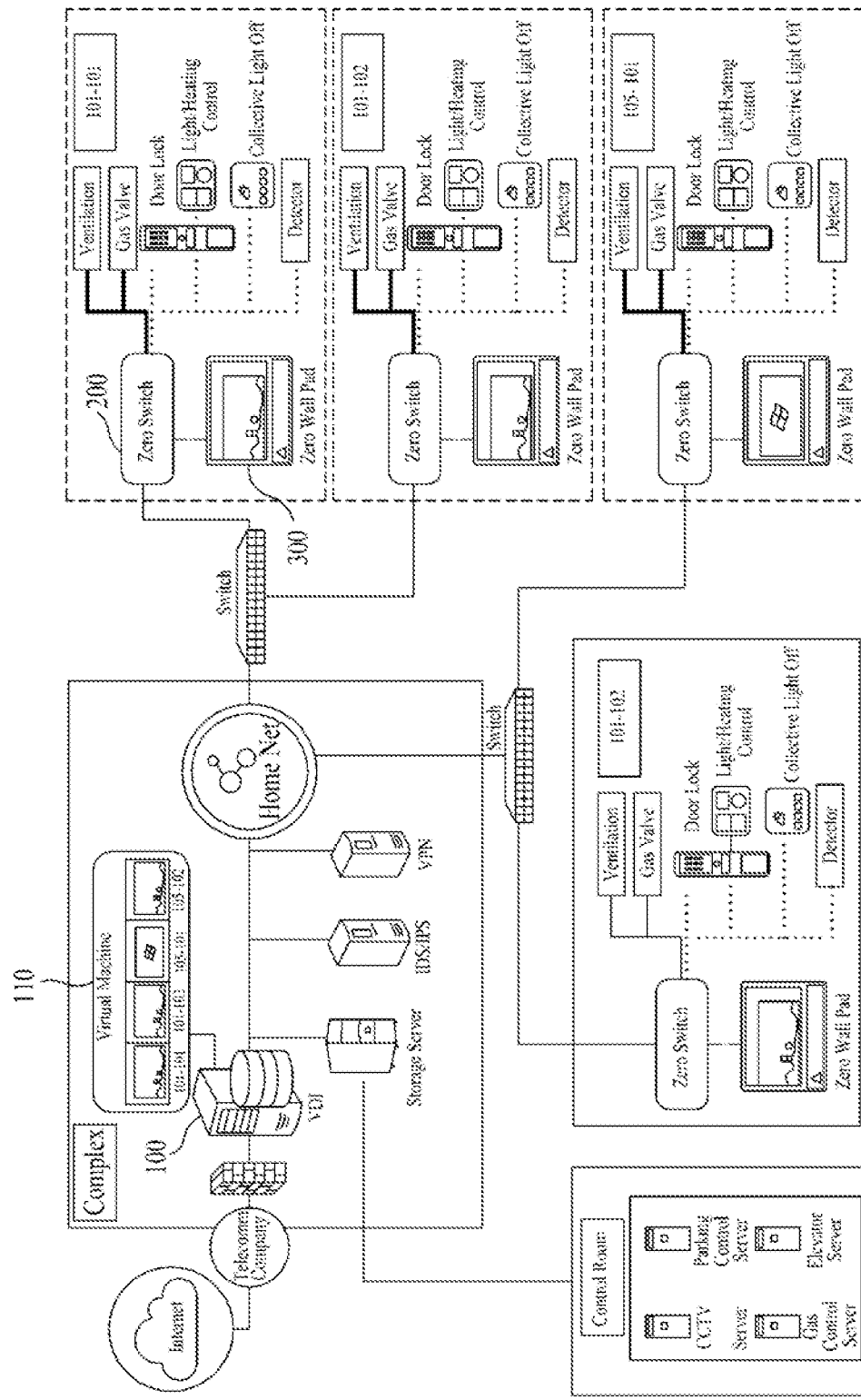
FIG. 1 illustrates an example of describing a cyber boundary wall system according to an example embodiment of the present invention and illustrates an example of a cyber boundary wall system in an apartment complex.

Advantages and features of the present invention and methods of achieving the same will become clear with reference to example embodiments described in detail with the accompanying drawings. However, the present invention is not construed as being limited to the example embodiments disclosed below and will be implemented in various forms different from each other. The example embodiments are provided to make the disclosure of the present invention complete and to inform the scope of the present invention to one of ordinary skill in the art to which the present invention pertains and the present invention is only defined by the scope of the claims.

The terminology used herein is for the purpose of describing the example embodiments only and is not to be limiting the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated components steps, operations, and/or elements, but do not preclude the presence or addition of one or more other components, steps, operations, and/or elements.

Unless otherwise defined herein, all terms used herein (including technical or scientific terms) have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments of the present invention will be described in detail with reference to the accompanying drawings. Like reference numerals refer to like components throughout and repeated description related thereto will be omitted.

The example embodiments of the present invention are to enhance security strength, to decrease a smart home system construction cost, and to reduce a maintenance and repair cost by implementing a cyber boundary wall construction method for preventing hacking of a smart home system using a software defined networks (SDN)-based zero wall pad (or wall pad) through a logical network separation.

Further, a wall pad in the present invention refers to a wall pad in which an operating system (OS) is removed and a router function interworking with the Internet of things (IoT) is separated as a separate household switch and, hereinafter, is referred to as a zero wall pad and thereby described. Also, the household switch that is separate from the wall pad and performs the router function and a gateway function is referred to as a zero switch and thereby described.

In the present invention, a server may be a virtual desktop infrastructure (VDI)-based server or a cloud-based server that is provided based on SBC and installed in an apartment building. Herein, the server will be described as the VDI-based server. Here, the server in the present invention is not restricted by or limited to the VDI-based server only and may include any type of servers capable of performing a system and a method of the present invention.

Also, the present invention constructs a virtual private network (VPN) that interworks with a zero switch and a virtualization server and the IoT and a smart metering network connected to a household switch are connected to a virtual machine for each household through the VPN and controlled and monitored accordingly.

A key issue of smart home system security lies in that, if a hacker accesses a wall pad installed in each household through a physical network (address resolution protocol (ARP) spoofing, etc.), the control of a smart home is transferred to the hacker and accordingly, a security issue cannot be fundamentally solved regardless of a boundary wall configured between households. The present invention may enhance security strength, may decrease a physical equipment cost, and may reduce a maintenance and repair cost of a wall pad by providing a zero wall pad in which an OS function is removed from a wall pad installed in a household and by constructing the zero wall pad and a zero switch supported with a virtual machine (VM) in a central VDI server.

Here, the zero switch may perform a zero client function, a hub function, and a gateway function.

FIG. 1 illustrates an example of describing a cyber boundary wall system according to an example embodiment of the present invention and illustrates an example of a cyber boundary wall system in an apartment complex.

Figure 2:
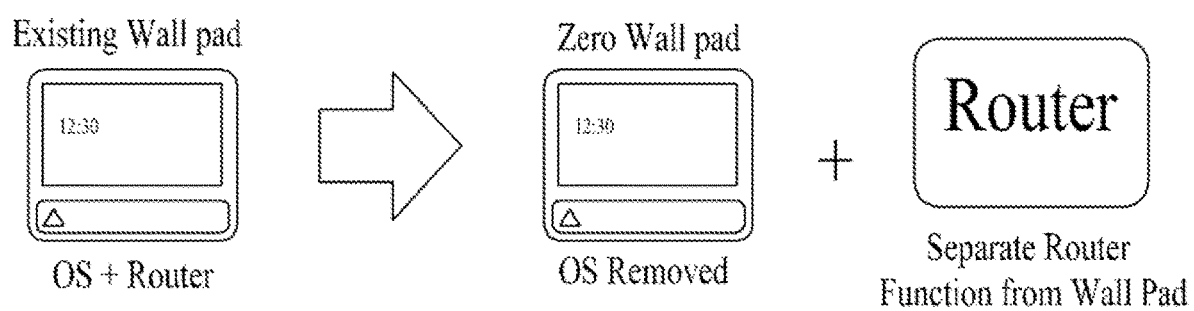
FIG. 2 illustrates an example of describing a wall pad and a household switch in the present invention.
Figure 3:
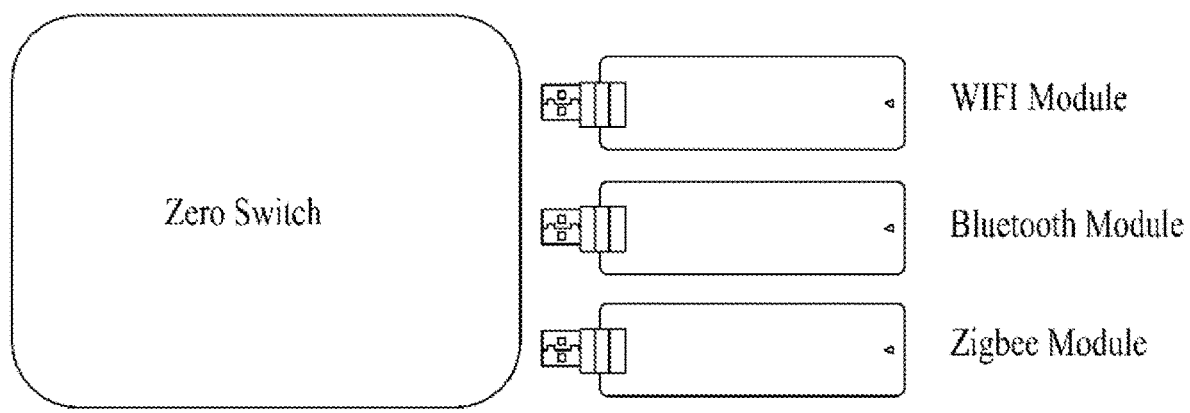
FIG. 3 illustrates an example of a structure of a household switch of the present invention.
Figure 4:
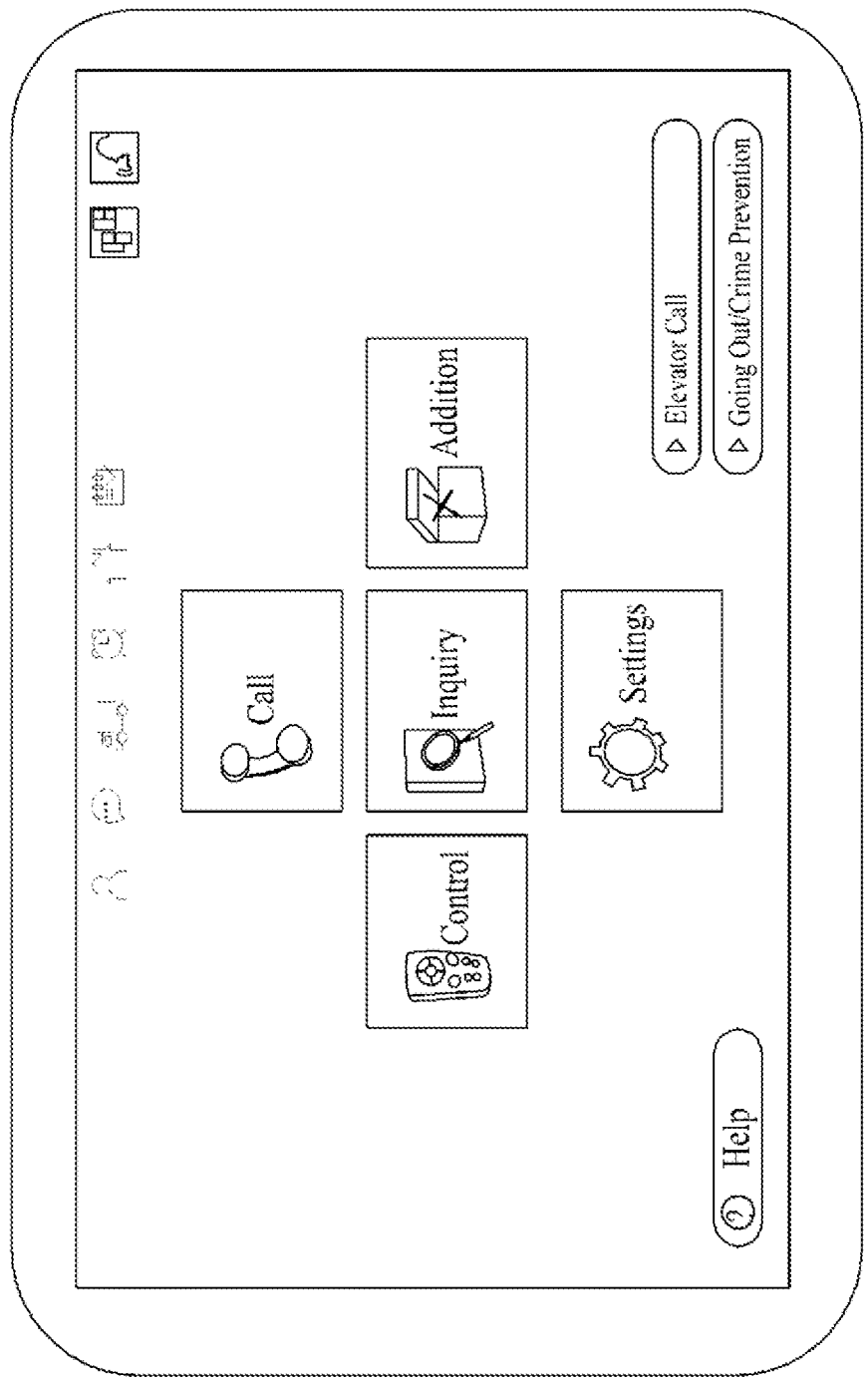
FIG. 4 illustrates an example of a virtual screen displayed on a wall pad.

Also, FIG. 2 illustrates an example of describing a wall pad and a household switch in the present invention, FIG. 3 illustrates an example of a structure of a household switch of the present invention, and FIG. 4 illustrates an example of a virtual screen displayed on a wall pad.

Referring to FIG. 1, a cyber boundary wall system according to an example embodiment of the present invention includes a server 100, a zero switch 200, and a zero wall pad 300. A system of the present invention may include configurations in an existing system, for example, a switch for each building, a storage server, and an intrusion detection system (IDS)/intrusion prevention system (IPS) server, description related to the existing system is omitted for clarity of description of the present invention.

The zero wall pad 300 displays a virtual screen corresponding to a user interface on a screen by receiving a virtual screen for each household (here, the virtual screen represents a screen corresponding to a user interface displayed on a zero wall pad) in which an OS function is removed and generated by the server 100 through the zero switch 200 of a corresponding household.

Here, the zero wall pad 300 may provide, to the zero switch 200, a control signal for controlling, the Internet of things (IoT) of the corresponding household, for example, a ventilation device, a gas valve, a door lock, a light/heating control device, a collective light off, and a detector. Here, the IoT is connected to the zero switch 200.

Since the virtual screen displayed on the zero wall pad 300 is generated through a virtual machine 110 for each household provided to the server 100 and the IoT is controlled according to a control signal provided through the zero wall pad 300, the virtual screen may be updated based on data about the controlled IoT and the updated virtual screen may be displayed on the zero wall pad 300. For example, referring to FIG. 4, the zero wall pad 300 may receive a virtual screen corresponding a user interface, for example, call, control, inquiry, addition, and settings, from the virtual machine 110 of a corresponding household provided to the server 100 and may display the received virtual screen. Such information may be stored in the server 100 for each household.

Referring to FIG. 2, the zero wall pad 300 in the present invention is configured with the zero switch 200 by removing an OS and by separating a router function, which differs from the existing wall pad that performs the OS and the router function. In the zero wall pad 300, the OS is removed and hacking of a smart home system through a wall pad is impossible, and security strength may be enhanced by concentrating security on the server 100. The existing wall pad provides a service by installing the OS and by installing application S/W of the wall pad thereon and thus, is operated in a structure in which hacking by OS vulnerability and virus is easy. Also, since the existing wall pad is embedded with a switch (home gateway) function for interworking between an IoT device within a household and a smart metering, a path of hacking by a network is provided. To solve this issue, the present invention may configure the zero wall pad 300 in which the OS of the wall pad that is a target of hacking is removed and a switching function is separated, thereby making hacking difficult and enhancing system security.

Also, since a function change and addition of the zero wall pad 300 may be performed through collective update in the server 100 without a need to visit each household, a maintenance and repair cost may be reduced. The zero wall pad 300 may receive a user input through a screen touch and may also receive a user input through a keypad and the like.

The zero switch 200 interworks with the IoT of a corresponding household by performing the router function separated from the existing wall pad and, controls the IoT of the corresponding household based on control information on the IoT input through the zero wall pad 300, and provides data about the controlled IoT to the server 100.

Here, since the zero switch 200 performs a router function as a device separate from the zero wall pad 300, a gateway function may be configured in the zero switch 200 and the gateway function may be performed using the zero switch 200 without overlappingly installing a gateway.

Since the zero switch 200 is installed for each household, the zero switch 200 may be regarded as a household switch. Referring to FIG. 3, since the router function is separated from the existing wall pad, an interface may be provided such that a wireless service, for example, WiFi, Bluetooth, and ZigBee, may be configured as a module such as a universal serial bus (USB) and added if necessary. Through this, a smart metering service including at least one of gas, hot water, electricity, and water may be easily provided.

As described above, since the OS is removed and the router function is separated from the existing wall pad, a cyber boundary wall may be configured through a logical network separation when a network is configured with the zero wall pad 300 and the zero switch 200. Since security may be concentrated on the server 100, security strength may be enhanced.

Referring to FIG. 1, the server 100 refers to a server for managing apartment complex as shown in FIG. 1 and description related to the zero wall pad 300 and the zero switch 200 only is made herein.

The server 100 refers to a VDI-based server and may include the virtual machine 110 for each household, may generate a virtual screen corresponding to a user interface displayed on the zero wall pad 300 configured for each household using the virtual machine 110, and may provide the generated virtual screen to the zero wall pad 300 of the corresponding household such that the virtual screen corresponding to the user interface and may display on the zero wall pad 300 for each household.

Here, the server 100 may display the virtual screen of the corresponding household on the zero wall pad 300 of the corresponding household by generating the virtual screen through the virtual machine 110 of each household based on data about the IoT of each household received through the zero switch 200 for each household and by providing the generated virtual screen to the zero wall pad 300 through the zero switch 200 of each household. That is, the server 100 may generate and provide a service for each household using the virtual machine 110 for each household, may store IoT data transmitted through the zero switch 200 for each household, may provide the stored IoT data for each household to the virtual machine 110 for each household, and may provide the same to the zero wall pad 300 for each household through the virtual machine 110.

Since the server 100 includes the virtual machine 110 configured to generate the virtual screen that is provided to the zero wall pad 300 for each household, addition, deletion, and update of the service may be collectively performed at the server 100, which may lead to enhancing security strength and reducing a maintenance and repair cost and time.

To provide a service of a wall pad for each household, the system according to an example embodiment of the present invention may virtualize the server 100, may install application software (S/W) in the virtual machine 110 for each household configured as SDN, may configure network function virtualization (NFV) between the zero wall pads 300, and may configure a primary cyber boundary wall by separating a wall pad service for transmitting the virtual screen of the virtual machine 110 to the zero wall pad 300 from a virtual network. For example, the present invention may compress a console screen of the virtual machine 110 and may quickly transmit the compressed console screen to a remote user connected over a network at low capacity and low delay, such that the user may use a remote virtual PC as if it is a local PC.

The system according to an example embodiment may virtualize the server 100, may include the virtual machine 110 for each household configured as SDN, and may configure the primary cyber boundary wall by configuring the NFV (virtual network) between the zero wall pads 300 installed for the respective households and by separating a physical communal network installed in an apartment building into a virtual network for each household. Here, a network of the primary cyber boundary wall may be configured through or without going through the zero switch (home gateway) 200 installed in each household.

In addition, the system according to an example embodiment of the present invention connects an IoT device and a smart metering network to the zero switch 200 by separately configuring the zero wall pad 300 and the zero switch 200 through virtualization of the wall pad. Therefore, the present invention may configure a secondary cyber boundary wall by configuring virtualization of the server 100 and a VPN server of the virtualized server 100 configured as SDN as a virtual network.

While a smart metering and an IoT device installed in a household are controlled and monitored through connection to a wall pad in the related art, the present invention connects the IoT device and the smart metering to the virtual machine 110 for each household configured as SDN through the VPN and, in this manner, the IoT device and the smart metering are controlled and monitored through the virtual machine 110 for each household. Therefore, it is impossible to modify data by hacking.

Figure 5A:
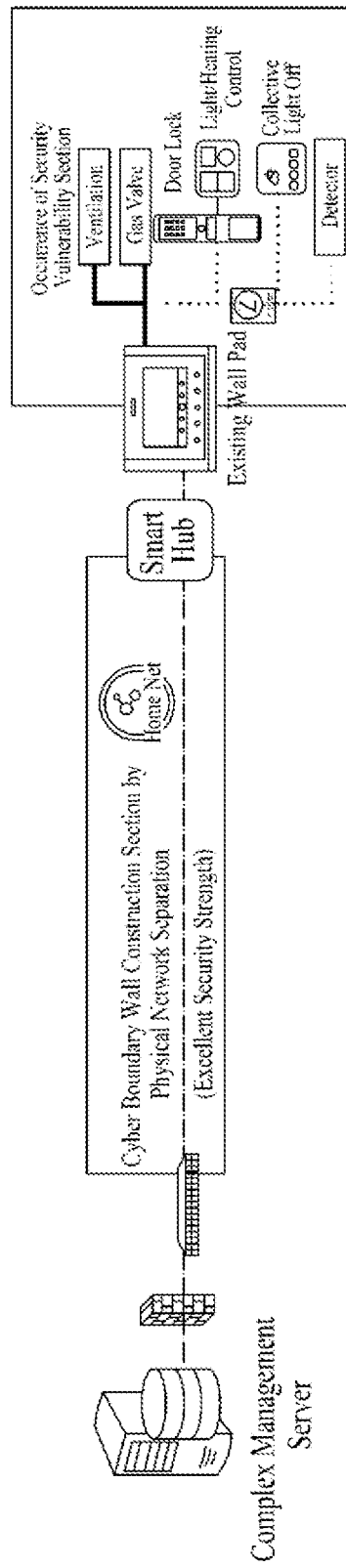
FIG. 5A illustrates a configuration of an existing cyber boundary wall and FIG. 5B illustrates a configuration of a double cyber boundary wall according to an example embodiment of the present invention.
Figure 5B:
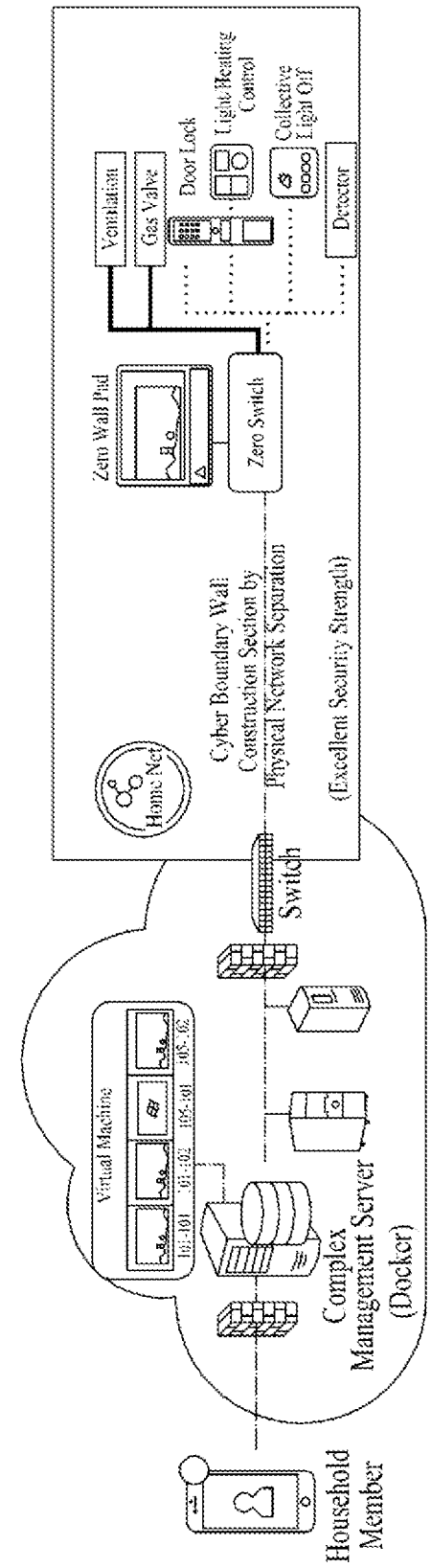

FIG. 5A illustrates a configuration of an existing cyber boundary wall and FIG. 5B illustrates a configuration of a double cyber boundary wall according to an example embodiment of the present invention.

Referring to FIG. 5A, since the existing cyber boundary wall configures a home gateway (smart hub) installed at a back end of the wall pad and a VPN server that interworks with a server as a virtual network, hacking of a network section may be prevented. However, since a security vulnerability section occurs in an IoT and smart metering portion linked to the wall pad, the IoT and the smart metering may be manipulated at the time of hacking the wall pad, which results in causing damage to a resident.

On the contrary, referring to FIG. 5B, the system according to an example embodiment of the present invention fundamentally blocks hacking through a local network separation between the VDI server 100 and the zero wall pad 300 and a configuration of the zero wall pad 300 and enhances security in an IoT network for a smart home service by configuring the cyber boundary wall through the physical network separation between the server 100 and the zero switch 200. Therefore, the present invention may further enhance security with a double cyber boundary wall by virtualizing the server 100 and thereby constructing a primary cyber boundary wall between the zero wall pad 300 and the virtualized server 100 that is configured as SDN and by configuring a VPN that interworks with the zero switch 200 and the virtualized server 100 and thereby constructing a secondary cyber boundary wall.

For example, although hacking occurs in the primary cyber boundary wall, the zero wall pad 300 is in a structure in which an OS is absent and a virtual screen is received using a protocol. Therefore, damage may not pass from a hacked corresponding household to another household and a server access may not be made.

Also, in the system according to an example embodiment, security between the virtual machines 110 is enhanced by configuring SDN through construction of the virtual machine 110 for each household based on the virtualized server 100.

Also, the system according to an example embodiment of the present invention configures an OS and application S/W of the existing wall pad in the virtualized server 100 by including the zero wall pad 300 virtualized from the wall pad. Therefore, the present invention may configure the cyber boundary wall with the more enhanced security by controlling control signals and data of the smart metering and the IoT that interwork with the zero switch 200 in the virtual machine 110 of the virtualized server 100.

Also, a conventional method in which a user controls the IoT after access to a wall pad using a user terminal, such as a smartphone, or verifies data through access to a server was vulnerable to security since the wall pad may be hacked. The system according to an example embodiment of the present invention may virtualize the server 100 such that the user may control the IoT device through access to the virtual machine 110 configured as SDN through an application of the user terminal or may search for data of the smart metering, and thus may provide the wall pad for security-enhanced smart devices (user terminals).

Also, the system according to an example embodiment of the present invention may implement 100% of a function of the wall pad by providing the wall pad for smart devices and by providing a screen of the virtual machine 110 as a virtual screen using NFV, and thus may configure a smart home service even without the zero wall pad 300.

Also, in the existing wall pad, performance degradation of application S/W and resource (CPU, RAM, storage capacity) issues occurs over time, making it difficult to provide various services other than a service provided previously. However, since the system according to an example embodiment may easily perform system update by virtualizing the server 100 and by updating application S/W in the server 100 configured as SDN and may additionally allocate a resource (CPU, RAM, storage capacity), the service may be further expanded.

As described above, the system according to an example embodiment of the present invention may enhance security strength, may decrease a smart home system construction cost, and may reduce a maintenance and repair cost by implementing a cyber boundary wall construction method for preventing hacking of a smart home system using a VDI-based zero wall pad through a logical network separation.

Also, although a cyber boundary wall between households is implemented through a logical network separation, the system according to an example embodiment of the present invention has superior security strength compared to the existing physical and software network separation and does not require a physical network device and thus, may be introduced to all apartment buildings and has excellent extensibility.

Also, the system according to an example embodiment of the present invention may configure a smart home system concentrated on the existing wall pad as a network separated from a household with respect to the wall pad and the smart home system and may construct a cyber boundary wall between households through a logical network separation as a configuration of the server and the zero wall pad.

Also, the system according to an example embodiment of the present invention may enhance security with a double cyber boundary wall by constructing a primary cyber boundary wall in which SDN-based wall pad and a server are virtualized and by configuring a VPN that interworks with a zero switch and the virtualized server and thereby constructing a secondary cyber boundary wall.

The system of the present invention may also provide a cloud-based system without being limited to a VDI-based system. That is, in the case of providing the cloud-based system, the system of the present invention may provide a service of the present invention by installing only a zero switch on an existing wall pad and, through this, may apply a cyber boundary wall with enhanced security strength at low cost. For example, although the system currently has a closed structure of providing a server within an apartment building and providing a service only to the apartment building, a structure of a virtualized server and a client (e.g., a wall pad) may apply a network section to a cloud and thus, there is an advantage that a service provided in a large complex may be provided to a small apartment building or a single-family house.

Further, since the system of the present invention has a virtual machine of a zero wall pad in a server, the system may drive the virtual machine even in a user terminal, such as a smartphone, not the zero wall pad in a household. Therefore, even though the zero wall pad is removed in the household and only a zero switch is installed, a smart home service may be implemented. That is, the system according to another example embodiment of the present invention may be configured using the server, the zero switch, and the user terminal. For example, a cyber boundary wall system according to another example embodiment of the present invention may include a zero switch configured to perform a router function that interworks with the IoT of a corresponding household and to control the IoT based on control information on the IoT input from a user, a server configured to receive data about the IoT of the corresponding household through the zero switch and to generate and provide a virtual screen for a user interface of the corresponding household based on the data about the IoT of the corresponding household, and a user terminal configured to control the IoT through the virtual screen of the corresponding household through connection to the server.

Also, although construction of a cyber boundary wall by the existing physical network separation applies only to a new apartment, the present invention enables a zero wall pad (thin clint wall pad) by installing application S/W in the existing old wall pad in all the households (new construction, old construction, apartment building, and multi-family housing, etc.) and may install a zero switch (that interworks with an IoT network in a household) and may construct the cyber boundary wall with high security strength that supports all functions of the wall pad in one's own smartphone without the wall pad.

Also, the system of the present invention may secure price competitiveness by providing sufficient performance even when the number of concurrently connected companies increases through advancement of a VDI server. According to an increase in the number of users, service fee of commercial S/W increases and performance limit occurs due to limit on the number of concurrently connected users. Therefore, the present invention may reduce usage fee by constructing not a commercial S/W-based server but an opensource-based server and may also achieve server advancement capable of reducing available resources such that performance limitations do not occur even in a simultaneous access.

Also, the system of the present invention may specify a user through a biometric authentication system of a zero wall pad by applying the biometric authentication system to the zero wall pad for security strength to an access to a user terminal (thin client), such as a smartphone, and may enhance the security through a process of authenticating an access to the user terminal interworking by the specified user. Further, the system of the present invention may provide a smart home service, such as a remote control, an intrusion detection, use of a closed-circuit television (CCTV), and opening and closing of a door lock using a terminal, through standardization of a user terminal (thin client)-based wall pad system.

Figure 6:
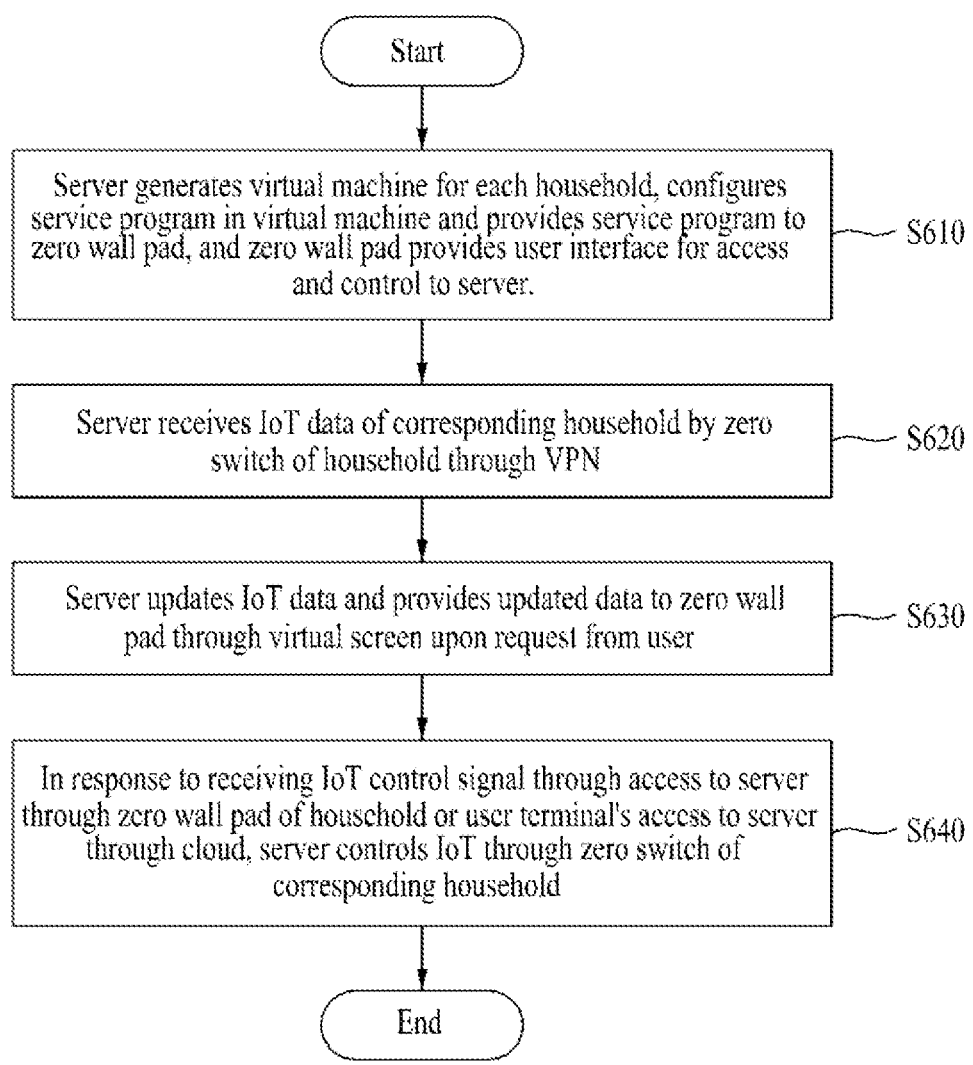
FIG. 6 is a flowchart illustrating an operation method of a cyber boundary wall system according to an example embodiment of the present invention and is a flowchart illustrating an operation method in a system of FIGS. 1 to 5.

FIG. 6 is a flowchart illustrating an operation method of a cyber boundary wall system according to an example embodiment of the present invention and is a flowchart illustrating an operation method in a system of FIGS. 1 to 5.

Referring to FIG. 6, in the operation method of the cyber boundary wall system according to an example embodiment including a zero wall pad in which an OS is removed and configured to provide a user interface for controlling the IoT of a corresponding household and a zero switch configured to perform a router function of a wall pad that interworks with the IoT of the corresponding household, a server generates a virtual machine for each household, configures a service program in the virtual machine, and provides the service program to the zero wall pad, and the zero wall pad provides the user interface for access and control to the server (S610).

The server receives data about the IoT of the corresponding household by the zero switch of the corresponding household through a VPN and the server updates the data about the IoT collected from the corresponding household and provides the updated data to the zero wall pad through a virtual screen upon request from a user (S620, S630).

In response to an access to the server through the zero wall pad of the household to control the IoT or in response to a user terminal that accesses the server through a cloud and gives an instruction to control the IoT, the server receives an IoT control signal and controls the IoT through the zero switch of the corresponding household based on the received IoT control signal (S640).

Hereinafter, this operation method of the present invention is described with reference to FIG. 7.

Figure 7:
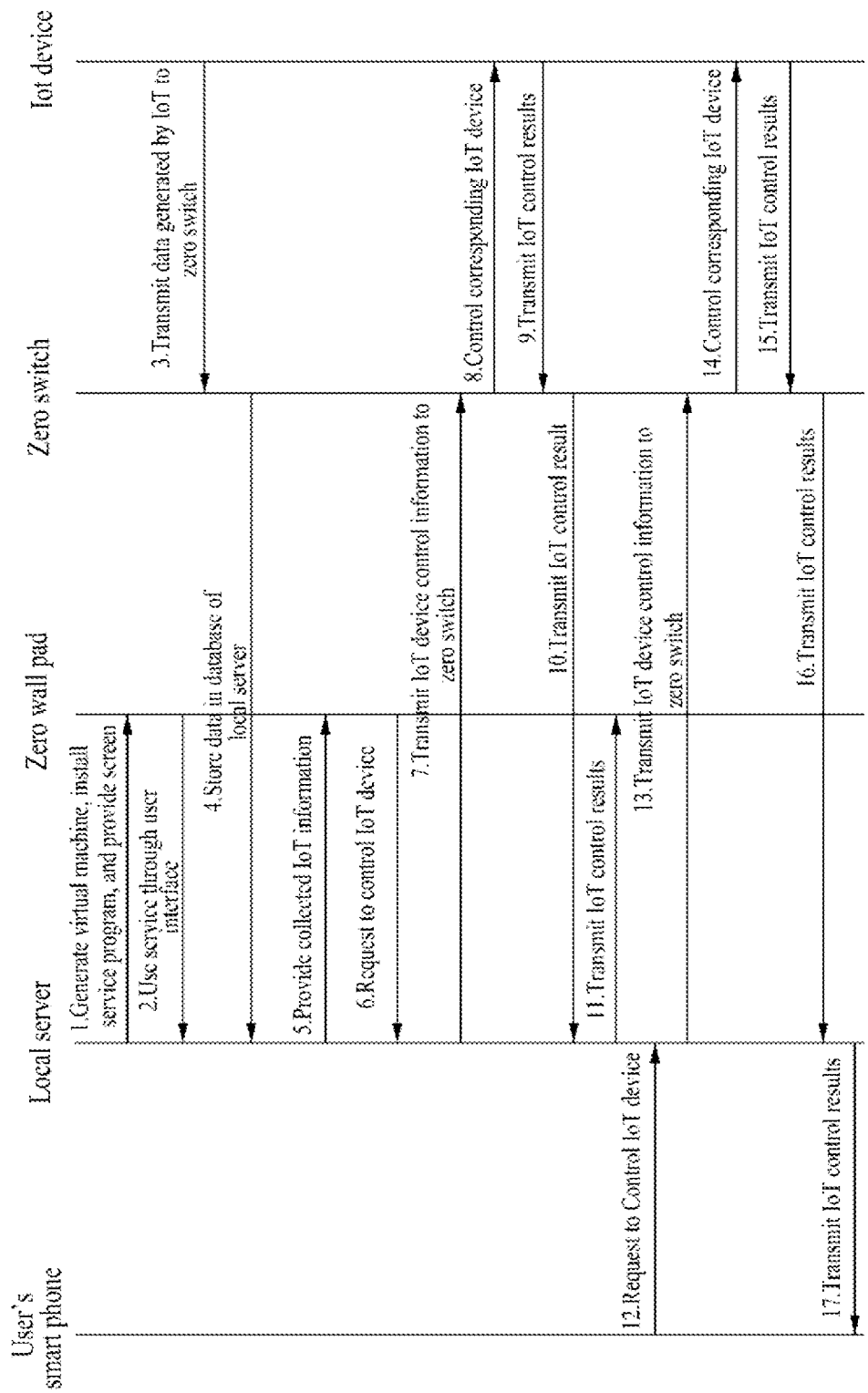
FIG. 7 illustrates an example of describing the method of FIG. 6.

Referring to FIG. 7, a server (a local server) generates a virtual machine for each household, installs a service program, and provides a virtual screen generated by the virtual machine to a zero wall pad for each household, and the corresponding household uses a service through a user interface using the virtual screen displayed on the zero wall pad.

Data generated by an IoT device of the corresponding household is provided to the server through a zero switch of the corresponding household, and the data is stored in a database of the server. When IoT data of the corresponding household is collected, the collected IoT data is provided to the zero wall pad of the corresponding household. The household requests the server to control the IoT device through the zero wall pad, the server transmits such a control signal to the zero switch, and the zero switch controls the corresponding IoT device requested by the user.

Once the corresponding IoT device is controlled through the aforementioned process, control results for the corresponding IoT device are transmitted to the server through the zero switch, the server provides the control results to the zero wall pad, and the user may verify results according to controlling of the IoT device.

Further, the method of the present invention may control the IoT of a user household by accessing the server through a user terminal, for example, a user smartphone. In detail, when the user accesses the server using the user terminal, that is, the smartphone and requests controlling of an IoT device, the server transmits an IoT device control signal to the zero switch, and the zero switch controls the corresponding IoT device, receives control results about the controlled IoT device and transmits the received control results to the server. The server provides such IoT control results to the user terminal and the user may verify the IoT device control results through the user terminal.

Although corresponding description is omitted in the methods of FIGS. 6 and 7, it is apparent to one skilled in the art that the methods of FIGS. 6 and 7 may include all the description made above with reference to FIGS. 1 to 5.

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied in any type of machine, component, physical equipment, virtual equipment, or a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in non-transitory computer-readable media. The media may also include, alone or in combination with the program instructions, data files, data structures, and the like. The program instructions recorded in the media may be specially designed and configured for the example embodiments or may be known to those skilled in the computer software art and thereby available. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of program instructions include both machine code, such as produced by a compiler, and files containing higher level code that may be executed by the computer using an interpreter.

While the example embodiments are described with reference to specific example embodiments and drawings, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. A cyber boundary wall system comprising:
a wall pad in which an operating system (OS) is not installed and that includes a user interface that can display a virtual screen for input of control information for a plurality of Internet of Things (IoT) devices of a corresponding household;
a household switch configured to connect to the IoT devices and a smart metering network, to perform a router function for the wall pad, and to control the IoT devices based on control information for the IoT devices that is input through the wall pad;
a server configured to receive data about the IoT devices of the corresponding household through the household switch, to generate the virtual screen for display by the user interface based on the IoT devices of the corresponding household, and then to provide the generated virtual screen to the wall pad; and
a virtual private network (VPN) configured to interwork with the household switch and the server;
wherein the IoT devices includes a ventilation device, a gas valve, a door lock, and a light/heating control device,
wherein the wall pad is configured to display the virtual screen provided by the server through the household switch,
wherein the server includes a virtual machine for the corresponding household that is configured to generate the virtual screen and then to provide the generated virtual screen to the wall pad,
wherein the household switch is configured to perform a gateway function and to provide an interface for adding at least one wireless communication module selected from the group consisting of a wireless fidelity (WiFi) module, a Bluetooth module, and a ZigBee module to provide a smart metering service that includes at least one of gas, hot water, electricity, and water,
wherein the IoT and the smart metering network are controlled and monitored through connection to the virtual machine for the corresponding household through the VPN.

* * * * *